July 12, 1927.

J. H. KEESEE 1,635,422

COMBINED END GATE AND PLATFORM

Filed Dec. 27, 1926

2 Sheets-Sheet 1

Inventor
J. H. Keesee
By Hiram A. Sturgis
Attorney

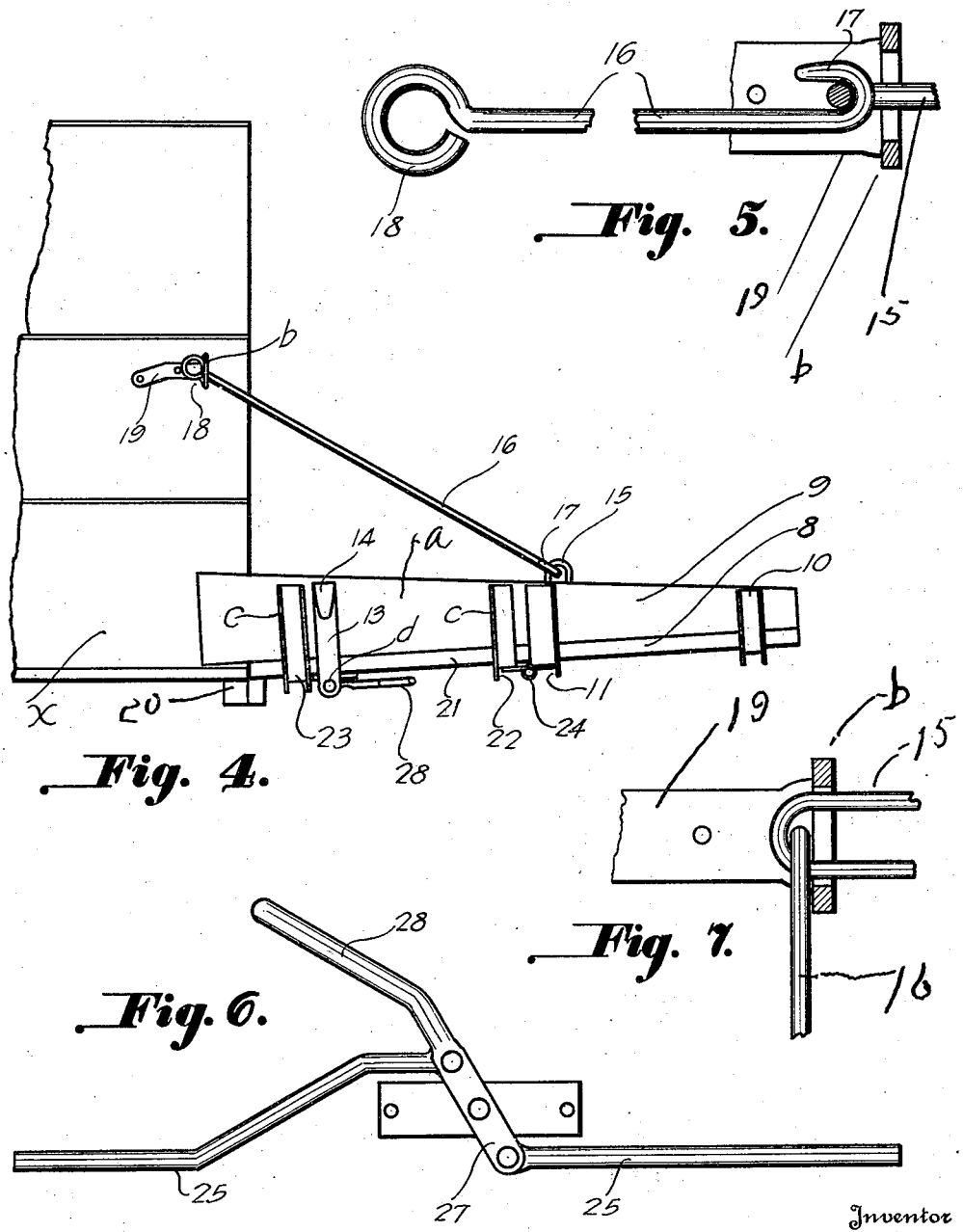

Patented July 12, 1927.

1,635,422

UNITED STATES PATENT OFFICE.

JOHN H. KEESEE, OF GRISWOLD, IOWA.

COMBINED END GATE AND PLATFORM.

Application filed December 27, 1926. Serial No. 157,024.

This invention relates to a closure for the open end of a wagon, truck or other vehicles, and has for its object to provide a combined gate and platform for a closure so that when disposed vertically it may make a complete closure and when swung rearwardly to approximately a horizontal position, it will provide a platform on which an operator may stand for scooping grain or other contents while unloading the box, the closure being provided with a door or gate which may be locked stationary with the platform or may be swung upwardly to permit grain and other contents to be discharged from the box.

The invention includes such a closure for a vehicle box that it may be separated and removed, and includes certain specific features found to be useful for securing the device to the box, and useful in operation.

With the foregoing objects in view and others to be mentioned, the invention presents a novel and useful construction, combination and arrangement of parts as described herein and claimed and illustrated in the accompanying drawings wherein,—

Figures 1, 2:
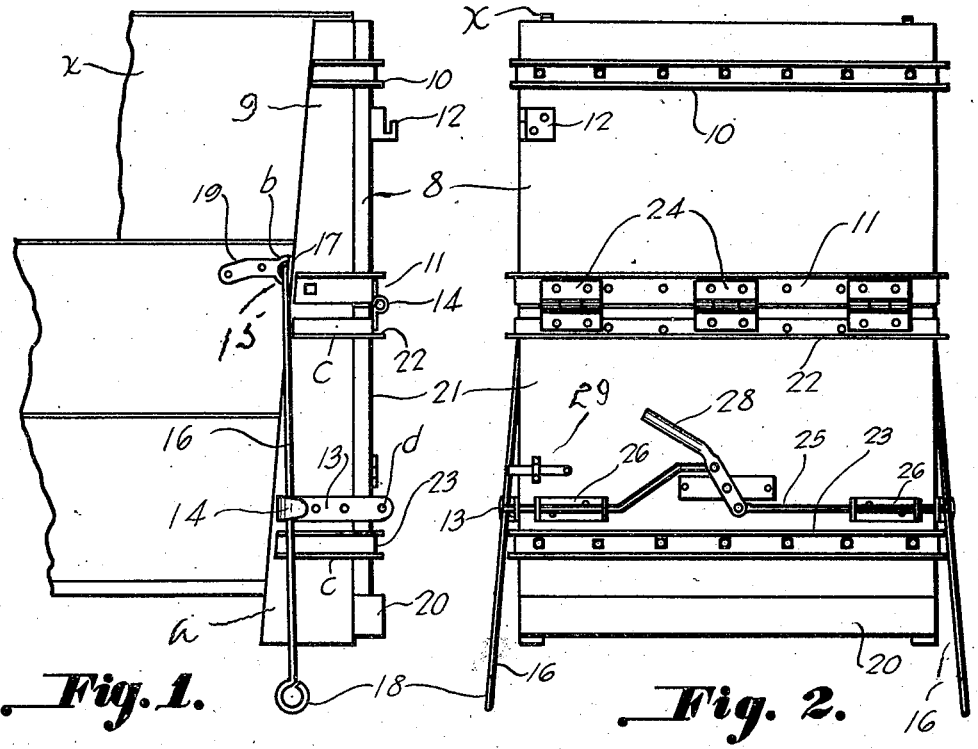
Figure 3:
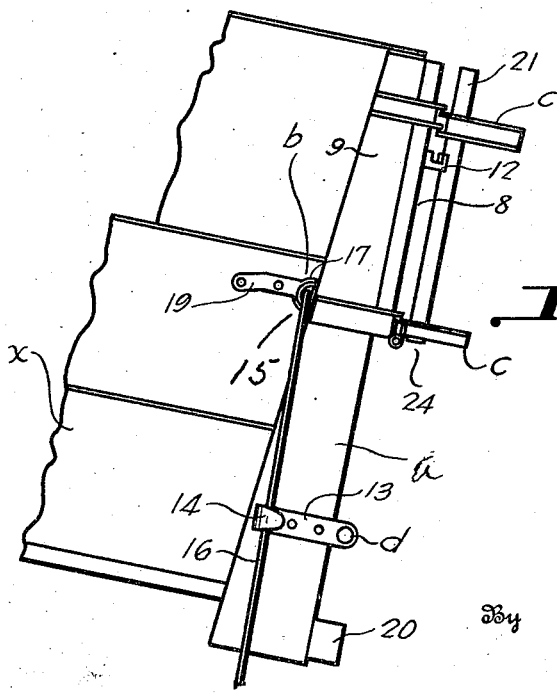

Fig. 1 is an end view of the device mounted upon a vehicle box. Fig. 2 is a rear or side view of the same. Fig. 3 is a view similar to that shown in Fig. 1, the gate being secured in an elevated position, and the box being inclined in a suitable position to permit unloading of grain or other contents. Fig. 4 illustrates the position of parts when the closure is used as a platform. Fig. 5 is a broken away detail, being a plan view of a link. Fig. 6 illustrates locking means for the gate. Fig. 7 is a broken away detail partly in section, to show the aperture of a guide receiving the staple of the platform and position of the link.

Referring now to the drawing for a more particular description, the device consists of a face plate 8, preferably of rectangular form, provided at two opposite edges with a pair of parallel brace-strips 9. These brace-strips have parts $a$ projecting beyond the lower edge of the face plate.

Numerals 10 and 11 indicate metallic reinforcing strips which extend across the face plate and having angular terminals which are secured to the brace-strips. Numeral 12 indicates a catch which is provided for the face plate. Each brace-strip 9 is provided near its inner or lower end with a metallic aligning strip 13, each being provided at one end of its ends with a hook 14.

Each brace-strip 9 is provided with a staple 15. Numerals 16 indicate a pair of links each being provided at one of its ends with a hook 17, each adapted to engage in a staple 15, the opposite end of each link being provided with a detent member or loop 18.

As thus described the face plate 8 and the pair of brace-strips 9 may be considered as a complete member to form a part of a platform and to form a part of a closure for the open end of the vehicle. The vehicle box is provided at its sides with a pair of guides 19 each having an apertured projection $b$, and in these apertures, the links 16 may have sliding movements. The vehicle box $x$ below its open end is provided with a sill 20.

Numeral 21 indicates a door or gate, said gate preferably being rectangular in plan and having a length corresponding to that of the face plate 8. It is provided with angular reinforcing strips 22 and 23, the terminals of these strips being indicated at $c$ and operating as detents for resisting stresses directed transversely of the gate, the latter being arranged to have swinging movements from its top by hinges 24, and in operation when the door is swung to a closed position, the angular terminals $c$ will be disposed closely adjacent to the outer sides of the brace-strips 9.

Each aligning strip 13 is provided with an aperture $d$ in its end opposite to its hook 14. Any suitable locking means may be provided for securing the door or gate to the brace-strips, the means herein shown consisting of a pair of locking bars 25, mounted in brackets 26, which are secured to the door. Their inner ends being pivotally mounted upon the ends of a rock bar, said rock bar being provided with a handle 28, a swinging movement of the handle in one direction will cause the locking bars 25 to engage in the apertures $d$ for securing the door or gate to the brace-strips 9, and a reverse swinging movement of said handle will release the lock bars to permit the door to be swung upwardly. Numeral 29 indicates a latch which is mounted upon the gate, and when the latter is swung upwardly to open position, it may be secured, the latch being disposed in engagement with the catch 12.

The device as described has been found to be very useful for various kinds of work. When unloading grain, the box may be disposed in the position shown in Fig. 3 ready for dumping, the gate being swung upwardly and secured to open position by the means last described. The device is useful upon vehicle boxes *x* arranged for carrying livestock, such as hogs or sheep, at which time the gate is elevated as last described, the vehicle at that time being disposed adjacent to a chute or passageway, having a height corresponding to the height of the vehicle box *x*, the latter at that time, of course, being disposed in a horizontal position.

When unloading corn, vegetables, or other similar contents from the box *x*, the parts are disposed as shown in Fig. 4, at which time the platform will be disposed in a horizontal position, upon which an operator may stand using a scoop for said unloading; the lower end-portion of the platform resting upon the sill 20, and being supported by the links, the door or gate at this time being secured in stationary relation with the brace-strips 9.

It will be noted that the hooks 18 for the links 16 are of such form that they may be readily removed from the staples 15 and therefore the device may be removed entirely from the box *x*. This feature is of advantage in some instances when the device is not needed for certain kinds of work. It will be noted that when the device is used as a platform and is disposed in the position shown in Fig. 4 of the drawing, the loops or detents 18 will engage the apertured projections *b* of the guides 19 which prevents any downward swinging movement of the platform below a horizontal position.

Also it will be noted that when the parts are disposed as shown in Figs. 1, 2, and 3 of the drawing, the apertured projections *b* last mentioned will receive the staples 15, and since the hooks 17 also engage the staples these parts operate to secure the device effectively to the open end of the vehicle box *x*.

It will be seen that in operation, when the platform is swung upwardly from the position shown in Fig. 4, the links 16 will slide in the apertured projections *b* of the guides 19, and in operation when the device has been swung upwardly to approximately a vertical position, the links will have moved entirely through the apertures of the projections *b*, the links then being swung downwardly to the position shown in Fig. 1, said links or the lower parts thereof being then secured in stationary relation with the brace-strips 9 on account of their engagement with the hooks 14 of the aligning strips 13.

The engagement of the links with the hooks 14 of the aligning strips 13 is an important feature for the reason that by this construction the closure device will be pressed against the open end of the box *x*, the proportion of parts being such that the links, while engaging the hooks 14 will be under tension. It will be understood that the hooks 17 of the links, at this time will be engaged in the staples and that when said links are moved into engagement with the hooks 14, the brace-strips 9 will be drawn into engagement with the projections *b* of the guides 19 for pressing the face plate and gate against the end of the box *x*, as mentioned.

While I have shown and described a pair of staples secured to the brace-strips, it will be understood that other apertured holders may be used for engagement with the hooks of the links and I do not wish to limit myself to specific details, and changes may be made in size, form and proportion of parts and minor details, said changes being determined by the scope of the invention as claimed.

I claim as my invention,—

In a closure device for a vehicle box open at its end and provided with apertured guides at its sides, a platform provided with staples, a gate provided with reinforcing strips having angularly disposed terminal portions and mounted on the platform to permit swinging movements thereof to dispose the terminal portions of the reinforcing strips at opposed parts of the platform, said platform and gate being adapted to engage the open end of the box, its staples engaging in the apertures of said guides, and a pair of links each provided with a hook removably mounted in a staple.

In testimony whereof, I have affixed my signature.

JOHN H. KEESEE.